Figure 3:
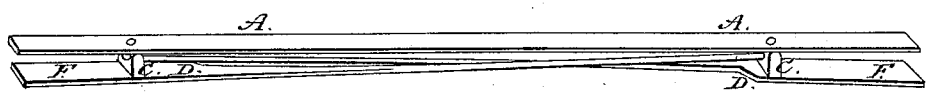

J. Hyde
Bed Bottom.

No. 68,442.      Patented Sep. 3, 1867.

Witnesses;
Marcus P. Norton.
Charles D. Kellum

Inventor;
Joseph Hyde

United States Patent Office.

JOSEPH HYDE, OF TROY, NEW YORK.

Letters Patent No. 68,442, dated September 3, 1867.

---

IMPROVED SPRING FOR BEDS AND OTHER PURPOSES.

---

*The Schedule referred to in these Letters Patent and making part of the same.*

---

TO ALL WHOM IT MAY CONCERN:

Be it known that I, JOSEPH HYDE, of Troy, in the county of Rensselaer, and State of New York, have invented certain new and useful "Improvements in Springs for Bed-Bottoms," and other purposes; and I do hereby declare that the following is a full, clear, and exact description thereof, reference being had to the accompanying drawing, making part of this specification, in which—

The Figure 3 is a perspective view of my invention.

The nature of my invention and improvements consists in so constructing springs for beds and similar articles, where weights are to be supported by springs, in such a manner that the weight rests upon the short arm of the springs, the long arms being connected loosely to the slats forming the bed-bottom, thus employing a much less powerful spring than would otherwise be necessary.

To enable others to make and use my invention, I will describe its construction and operation.

In applying my spring to the slat of the bedstead, I attach the fulcra $c$ to the under side of the slats A loosely or by a rocking or other suitable joint, which will permit the necessary changes in the relative position of the springs and the slats, caused by the yielding of the springs under the weight; or they may be rigidly attached to the slat A and jointed loosely to the springs D at the fulcra $c$, which should be placed equidistant from each end of the slat, and as near the end as may be desired, or as may be necessary to support the weight to be applied and afford a proper elasticity. It will be obvious that the nearer the fulcrum-bearings $c$ are placed to the ends of the slats the stiffer the springs will be, and *vice versa*. As shown in fig. 3, the long arms of the springs D pass loosely through suitably-prepared recesses or openings in the fulcrum-blocks $c$ of the opposite spring. The elasticity of the springs D is regulated by the comparative length of their long and short arms and the material or kind of wood of which they are composed. When the slats of a bedstead are constructed in accordance with my invention, as heretofore described, the short arms of the springs D, which are marked F, rest upon suitably constructed supports in the frame of the bedstead, while the slats A are not rigidly fixed but rest upon the springs so as to move freely vertically with the yielding springs.

By the construction above described I am enabled to provide a spring or elastic support for weights which is very simple and efficient, and its cheapness and adaptability will recommend it to general use in place of the cumbersome and costly devices which have heretofore been employed.

What I claim as my invention, and desire to secure by Letters Patent, is—

The spring, composed of the slat A, or its equivalent, the springs D, with the fulcra $c$, constructed, arranged, and operating substantially in the manner and for the purposes herein shown and described.

JOSEPH HYDE.

Witnesses:
CHARLES D. KELLUM,
E. COWEN